United States Patent [19]

Gray

[11] Patent Number: 5,012,482
[45] Date of Patent: Apr. 30, 1991

[54] GAS LASER AND PUMPING METHOD THEREFOR USING A FIELD EMITTER ARRAY

[75] Inventor: Henry F. Gray, Alexandria, Va.

[73] Assignee: The United States of America as represented by the Secretary of the Navy, Washington, D.C.

[21] Appl. No.: 581,620

[22] Filed: Sep. 12, 1990

[51] Int. Cl.$^5$ .............................................. H01S 3/09
[52] U.S. Cl. ...................................... 372/74; 372/69; 372/55; 372/92; 313/309
[58] Field of Search .................... 372/87, 74; 376/92, 376/69; 378/55; 313/309

[56] References Cited

U.S. PATENT DOCUMENTS

| | | | |
|---|---|---|---|
| 3,755,704 | 8/1973 | Spindt et al. | 313/309 |
| 3,798,570 | 3/1974 | Hagood et al. | 372/69 |
| 3,800,244 | 3/1974 | Karras | 372/56 |
| 4,307,507 | 12/1981 | Gray et al. | 313/309 |
| 4,513,308 | 4/1985 | Greene et al. | 313/309 |
| 4,578,614 | 3/1986 | Gray et al. | 313/309 |
| 4,641,316 | 2/1987 | Collins et al. | 372/74 |
| 4,677,638 | 6/1987 | Beaupere et al. | 372/87 |
| 4,721,885 | 1/1988 | Brodie | 313/309 |
| 4,766,340 | 8/1988 | van der Mast et al. | 313/309 |
| 4,835,438 | 5/1989 | Baptist et al. | 313/309 |
| 4,858,237 | 8/1989 | Maitland et al. | 372/74 |
| 4,894,838 | 1/1990 | Kraft et al. | 372/74 |
| 4,901,028 | 2/1990 | Gray et al. | 313/309 |

Primary Examiner—Leon Scott, Jr.
Attorney, Agent, or Firm—Thomas E. McDonnell; Edward F. Miles

[57] ABSTRACT

An apparatus and method for pumping a gas laser, wherein a field emitter is used to emit electrons into the gas to effect laser pumping. The low energy electrons emitted by field emitters, and the fine controllability of electron energy permitted by field emitters, enables one to effect population inversion of the laser gas, without ionizing the gas, or causing electrical breakdown.

12 Claims, 5 Drawing Sheets

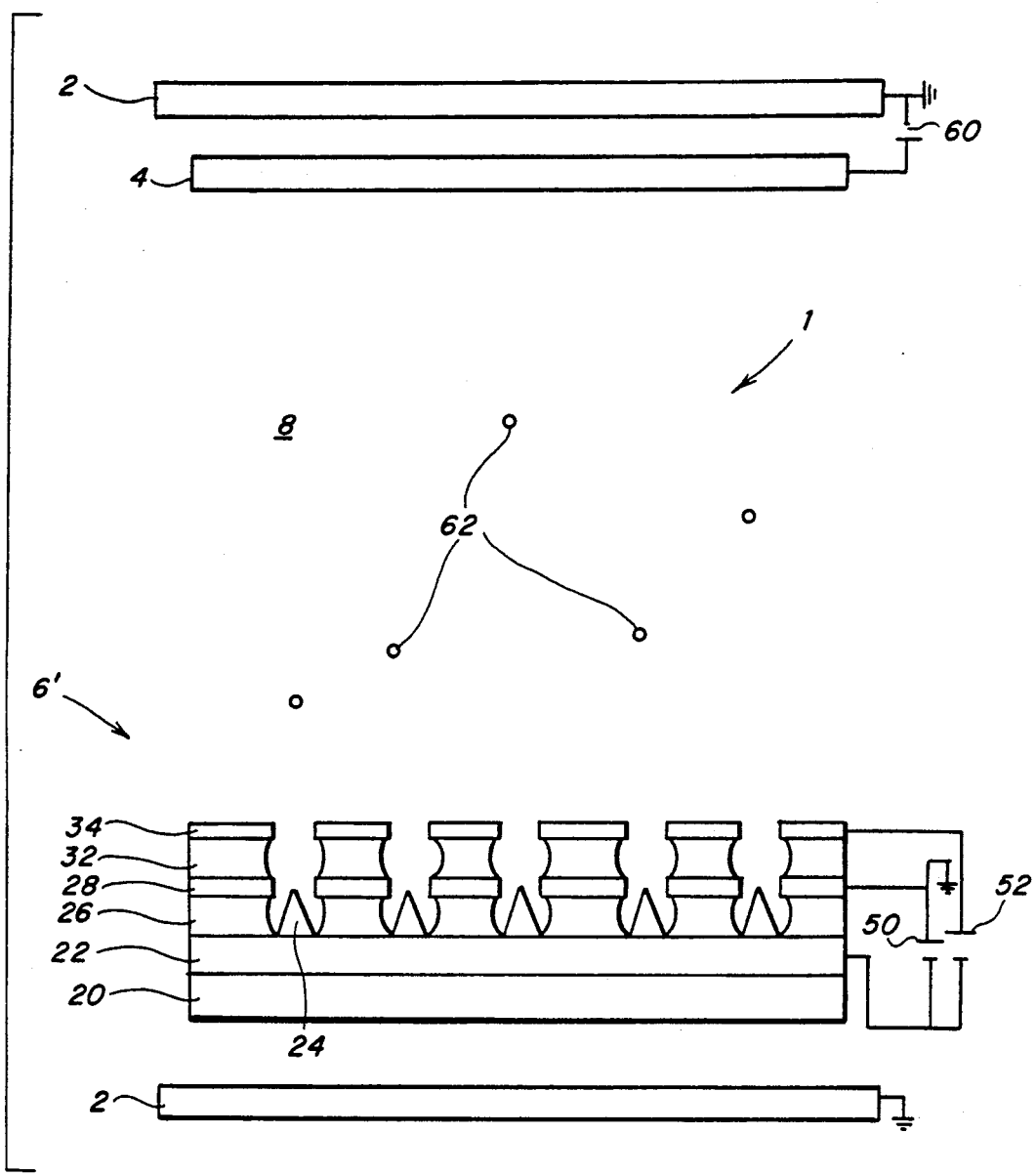
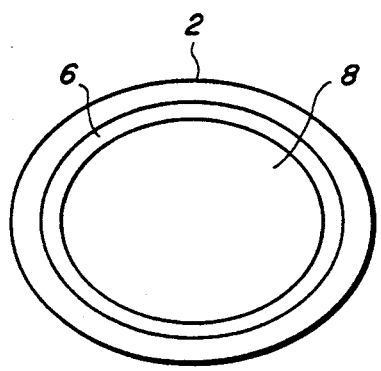
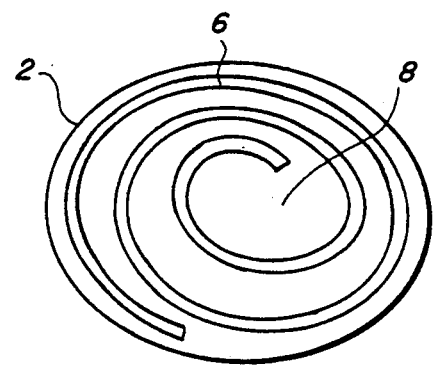
FIG. 5
FIG. 6A
FIG. 6B

GAS LASER AND PUMPING METHOD THEREFOR USING A FIELD EMITTER ARRAY

FIELD OF THE INVENTION

The present invention relates generally to gas lasers, and more specifically to methods for controlling the excitation energy level of gas lasers.

BACKGROUND OF THE INVENTION

Many gas lasers are excited by electron impact with a gas in a laser cavity. Electrons are accelerated by an electric field and transfer energy to the gas atoms or molecules by collisions. The process of raising electrons to an excited state is referred to as pumping. One typical configuration of such gas lasers is a transverse-electric-discharge configuration in which a pair of long electrodes (or a pair of linear arrays of electrodes) is located parallel to the optical axis of the gas laser and within the cavity of the laser so that the electron current flows transversely to the optical axis. U. S. Pat. No. 4,677,638 shows one example a transverse-electric-discharge gas laser.

Prior art gas lasers have typically relied on flash lamps; positioning electron sources outside the laser cavity proximate to a cavity window; and hot thermionic cathodes or secondary electron emission cold cathodes within the laser cavity as sources for stimulating laser radiation emissions. Gas lasers using flash lamps for stimulation require high current, high voltage power supplies to drive the flash lamp. In addition, only pulsed output is provided by the gas laser using the flash lamp. Electron sources outside the laser cavity require high energy power supplies to provide electrons with sufficient energy to penetrate the cavity window, e.g., a mylar sheet. Even if the energetic electrons start with a uniform energy, the electrons entering the cavity possess a broad energy distribution due to electron scattering in the window material. Some of the electrons reaching the gas in the cavity are above the ionization potential of the gas, and ultimately produce avalanche breakdown in the cavity.

When either hot or cold cathodes are used in a conventional gas laser, a high potential must be maintained across the laser cavity. The use of a hot thermionic cathode results in a number of problems. First, heat is transferred to both the laser gas and the laser envelope. Second, a hot thermionic cathode requires a heater power supply. Third, the active surface of the cathode evaporates during use. Fourth, a high potential is required across the cavity to accelerate the electrons from zero energy, which produces a significant electron energy distribution and associated avalanche breakdown in the gas. This results in ion production and associated sputtering of the hot cathode.

Problems are also associated with secondary emission cold cathodes. First, avalanche breakdown occurs because of the high potentials necessary for producing secondary electron emission from the cathode. In most cold cathode applications, avalanche effects are necessary for operation. Secondly, high energy ions sputter away the cathode. Third, the cathode itself must be large because the secondary electron coefficient is very small. This results in a very small number of electrons emitted from the cold cathode.

Gas lasers are often used in applications such as laser gyros. An ideal electron source for a laser gyro would provide electrons at a controllable energy, which is less than the ionization potential of the gas or gases in the laser cavity. In addition, the electron source would be powered from a compact light weight power supply, which advantageously would stimulate the production of electrons without excessive warmup times. A conventional gas laser using either a hot cathode or a secondary emission cold cathode results in problems similar to those described above. In addition, since there is a definite warmup time associated with hot cathodes, laser gyros employing a hot cathode must be continuously energized.

Although field emitter arrays have been used for high speed electronics, ultrafast switches and spin polarized devices, e.g., U. S. Pat. Nos. 4,721,885, 4,578,614 and 4,835,438, respectively, and have also been used as electron sources in flat panel and cathode ray tube (CRT) displays, heretofore gas lasers have not been excited using such a technique.

SUMMARY OF THE INVENTION

Accordingly, the principal object of the present invention is to provide a gas laser and method of electron pumping in a gas laser which overcomes the problems described above.

Another object of the present invention is to provide a gas laser and a method for electron pumping such gas laser systems with electrons at controllable energy levels.

Another object is to provide an improved gas laser and method for electron pumping of such gas laser systems which are responsive to a wide variety of frequencies.

A further object is to provide an improved gas laser and method for electron pumping wherein an anode is not required.

A further object is to provide an improved gas laser particularly suited for laser gyro applications.

These and other objects and advantages are achieved in accordance with the present invention, which in its broadest form is a gas laser system comprising a laser cavity containing a laser active gas, and a field emitter for emitting electrons effective to pump the gas to cause the system to lase. The field emitter preferably emits the electrons at energies insufficient to cause breakdown emission in the gas.

By using field emitter technology to pump the gas, one can dispense with the high current requirements of, e.g., flash lamps, thermionic cathodes, secondary electron emitters, external electron sources, etc., and the expensive power supplies needed by these kinds of electron emitters. Because field emitters produce electrons from the Fermi level of the material from which the emitter is made, these electrons are emitted at generally uniform energy, and without the great expenditure of excess energy one gets with other kind of emitters. Because field emitters can be located virtually anywhere in the laser cavity, use of field emitters permits a designer to construct lasers with unusual geometries not permitted by other kinds of electron emitters. (As just one example, one could wrap a plurality of such emitters along the cavity's wall and about the cavity's optical axis, which permits a large density of field emitters in a small volume, i.e. permits large pumping in a small, compact, laser device.) Additionally, by choosing the field emitter to emit electrons at energies less than the gas's breakdown potential, one avoids all the problems of controllability and energy wastage inherent in lasers pumped into breakdown.

A more particular embodiment of the invention is a gas laser and pumping method in which a field emitter array, having a plurality of conducting layers and having an insulating layer between any two of the conducting layers, and an anode are positioned within a gas laser cavity envelope. According to another embodiment of the present invention, a first variable power supply is connected between a first conducting layer and a second conducting layer and a first voltage is applied to the field emitter array to produce an electron current from the field emitter array. According to another embodiment of the present invention, the first variable power supply is connected between the first conducting layer and the second conducting layer of the field emitter array; a second variable power supply is connected between the first conducting layer and a third conducting layer of the field emitter array; the first voltage from the first variable power supply is applied to the field emitter array to produce an electron current from the field emitter array; and a second voltage is applied from the second variable power supply to adjust the energy level of the electrons produced by the field emitter array. In both of the latter two embodiments, an anode power supply is connected to the anode for aiding or retarding the flow of electron with the gas laser cavity.

According to two additional embodiments of the present invention, the gas laser system comprises a field emitter array positioned within the gas laser cavity envelope. The anode and the anode power supply can be omitted from these embodiments. Thus, the field emitter array according to these embodiments of the present invention are not limited to an array located substantially parallel to the optical axis of the cavity.

BRIEF DESCRIPTION OF THE DRAWINGS

These and other features and advantages of the present invention are disclosed in or apparent from the following detailed description of preferred embodiments. The preferred embodiments are described with reference to the drawings, in which like elements are denoted throughout the figures with like reference numbers, and in which:

FIG. 5 is an expanded view of a section of a gas laser system using the field emitter array of FIG. 4, in which the electrical connections to the anode and the field emitter array are shown;

FIGS. 6A and 6B are sectional views of laser system 1, in which alternate arrangements of field emitter array 6 are shown;

DESCRIPTION OF THE PREFERRED EMBODIMENTS

Figure 1:
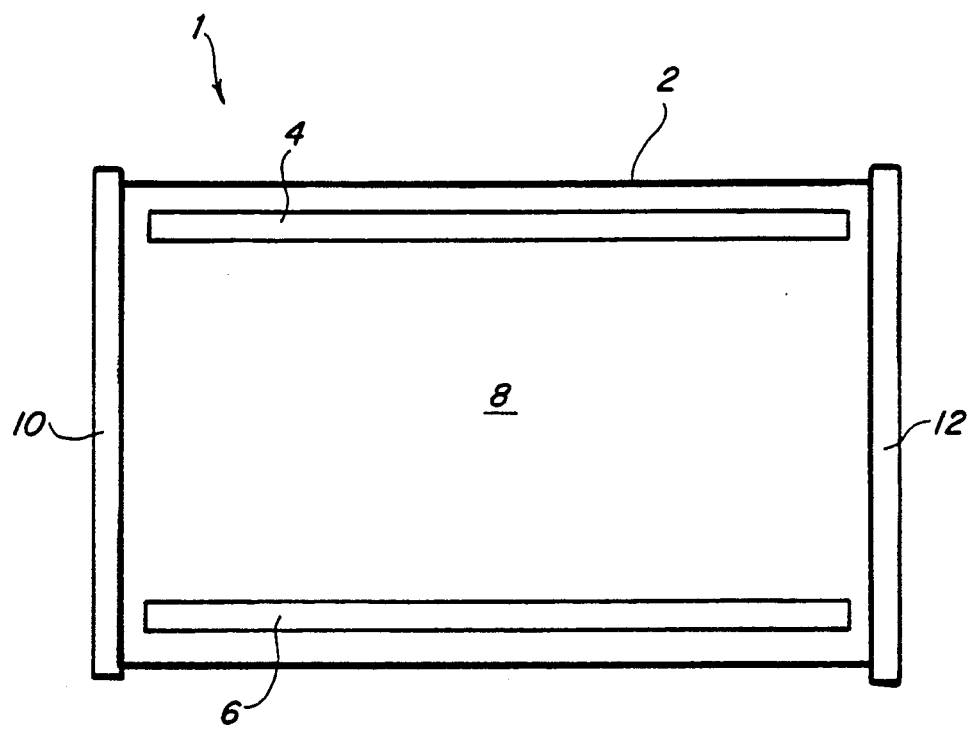
FIG. 1 is a diagrammatic view of a preferred embodiment of a gas laser system according to the present invention using a first embodiment of a field emitter array.

Referring to FIG. 1, a gas laser system 1 according to the present invention comprises a laser cavity envelope 2 which forms the body of the gas laser system. Within laser cavity envelope 2 are disposed an anode 4 and a field emitter array 6. Anode 4 and the field emitter array 6 are arranged to lie parallel to the optical axis of laser cavity envelope 2. A cavity 8 is filled with gas. In the preferred embodiment, this gas is a mixture of helium and neon (He-Ne) gas, although other gases and mixtures advantageously are used.

Reflecting surfaces 10 and 12 are disposed on two sides of envelope 2 perpendicular to the optical axis of the gas laser system. The reflectivity of reflecting surface 10 is 100% while the reflectivity of reflecting surface 12 is a predetermined value depending on the wavelength of laser light and a selected operating power level.

Figure 2:
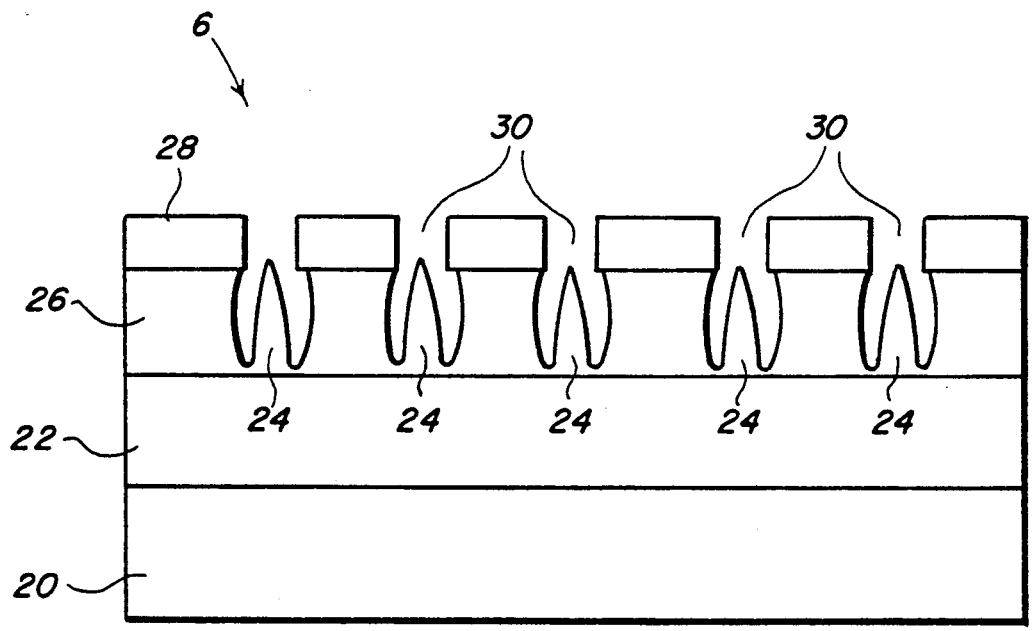
FIG. 2 is an expanded view of a section of the field emitter array shown in FIG. 1.

Referring to FIG. 2, a first preferred embodiment of field emitter array 6 comprises a first conducting layer 22 deposited on a non-conducting substrate 20. Layer 22 is a continuous layer of material fabricated with a plurality of emitter tips 24. A first insulation layer 26 is deposited on first conducting layer 22 in such a manner that first insulation layer 26 completely surrounds each emitter tip 24 at a uniform distance from the axis of emitter tips 24. A second conducting layer 28 is deposited above first insulation layer 26 such that one surface of the first insulating layer 26 is bonded to one surface of the second conducting layer 28, which advantageously includes a plurality of holes 30. The center of each hole 30 corresponds to the axis of one of the emitter tips 24.

Figure 3:
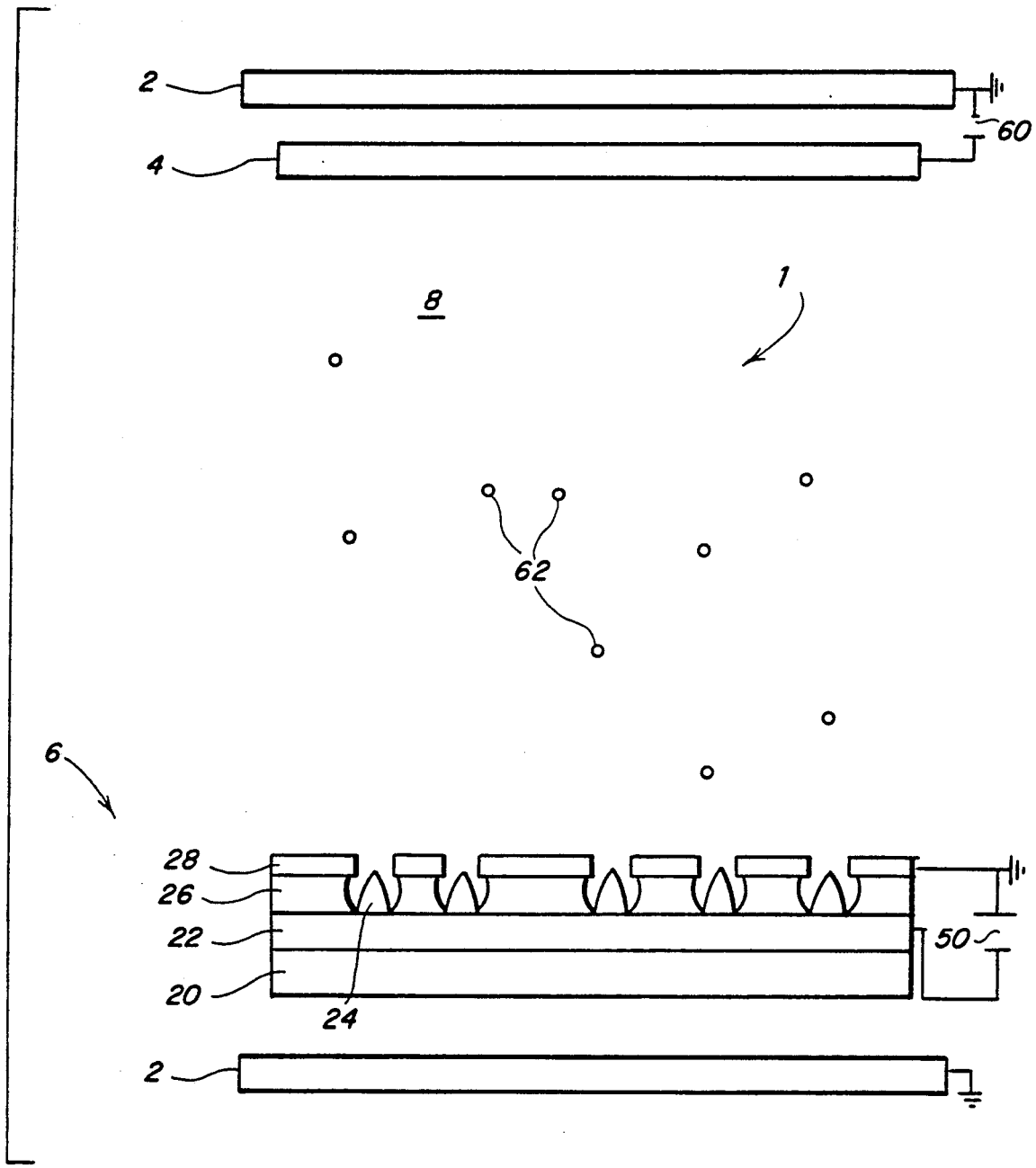
FIG. 3 is an expanded view of a section of the gas laser system of FIG. 1 showing electrical connections to the anode and the field emitter array.

The operation of the gas laser system will now be described referring to FIG. 3, which shows an expanded view of the gas laser system 1, including laser cavity envelope 2, anode 4, field emitter array 6 and cavity 8. A first variable power supply 50 is connected across second conducting layer 28 and first conducting layer 22. An anode power supply 60 is connected between anode 4 and ground, e.g., laser cavity envelope 2. By applying a voltage from power supply 50, a plurality of electrons 62 are emitted from emitter tips 24 perpendicular to first conducting layer 28 and transverse toward the optical axis of the gas laser system. The voltage applied to anode 4 by power supply 60 maintains a potential between array 6 and anode 4, for further controlling the electron 62 flow across cavity 8. Electrons 62 excite the metastable states of the gas or mixture in cavity 8. Stimulated emission of radiation (light) is now possible given the excited state of the gas molecules.

The use of field emitter array 6 as the electron 62 source in the present invention advantageously allows the electron density in cavity 8 to be varied by changing the density of emitter tips 24 parallel to the optical axis of the laser cavity 8. As shown in FIG. 3, high and low density electron 62 "beams" can be created perpendicular to the optical axis of the gas laser system to optimize the power output of the gas laser system.

Figure 4:
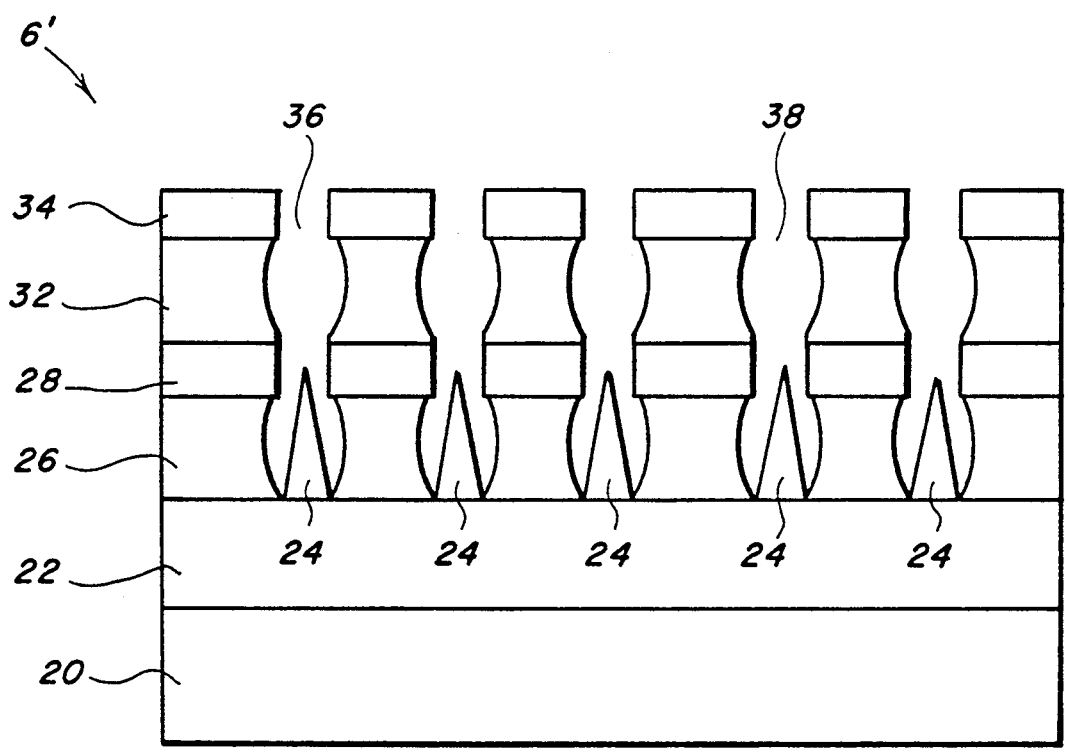
FIG. 4 is an expanded view of a second embodiment of a field emitter array for use with the gas laser system shown in FIG. 1.

Referring to FIG. 4, a field emitter array, denoted 6', according to a second embodiment of the present invention, will be described. Field emitter array 6' is like field emitter array 6 of FIG. 2, but includes a second insulation layer 32, containing holes 36, deposited on second conducting layer 28, with the center of each hole 36 corresponding to the axis of one of the emitter tips 24. A third conducting layer 34 is deposited above second insulation laYer 32 such that one surface of the second insulating layer 32 is bonded to one surface of third conducting layer 34. Another surface of second insulating layer 32 is bonded to second conducting layer 28. Third conducting layer 34 is also fabricated with a plurality of holes 38. The center of each hole 38 again corresponds to the axis of one of the emitter tips 24.

The operation of the gas laser system will now be described in relation to FIG. 5, which shows a sectional view of gas laser system 1 including laser cavity envelope 2, anode 4, field emitter array 6' and cavity 8. A first variable power supply 50 is connected across second conducting layer 28 and first conducting layer 22. A second variable power supply 52 is connected across third conducting layer 34 and first conducting layer 22. An anode power supply 60 is connected between anode 4 and ground, e.g., laser cavity envelope 2. By applying a voltage from the first variable power supply 50, emitter tips 24 are excited and produce a flow of a plurality of electrons 62 perpendicular to first and second conduction layers 28, 34, which direction is transverse to the optical axis of gas laser system 1. A voltage applied by second variable power supply 52 adjusts the energy of electrons 62 emitted from emitter tips 24. The anode voltage applied to anode 4 by power supply 60 maintains a potential between field emitter array 6' and anode 4, providing further control of the electron flow across cavity 8. Electrons 62 excite the metastable states of the gas or mixture in cavity 8. Stimulated emission of radiation (light) is now possible given the excited state of the gas molecules.

The gas laser system of the present invention as described above offers several advantages over conventional gas laser systems. The voltages applied by the power supply 60 and first and second variable power supplies 50, 52 can be on the order of tens of volts, which low voltages ensure that avalanche breakdown and ionization of the gas in the cavity 8 do not occur. In addition, the size of power supply 60 and first and second variable power supplies 50, 52 can be small and light weight. It will also be appreciated that the present invention also minimizes or eliminates sputtering of the electron source, e.g., cathode tips 24.

In third and fourth preferred embodiments of the present invention, including arrays 6 and 6', respectively, both the anode 4 and power supply 60 are omitted. Since power supply 60 is used to aid or retard the flow of electrons 62 across the cavity 8, the anode 4 and the power supply 60 are only required when such additional adjustment of the electron 62 flow is desired. When such additional control is not required, the omission of the anode 4 and the power supply 60 further reduces the size and the complexity of the gas laser system. For example, the field emitter array 6 (6') advantageously is fabricated on a flexible substrate so as to allow the field emitter array to conform to the interior shape of the laser cavity 8, as shown in FIG. 6A, or to locate a portion of array 6 (6') in the interior of cavity 8, as shown in FIG. 6B.

Figure 7A:
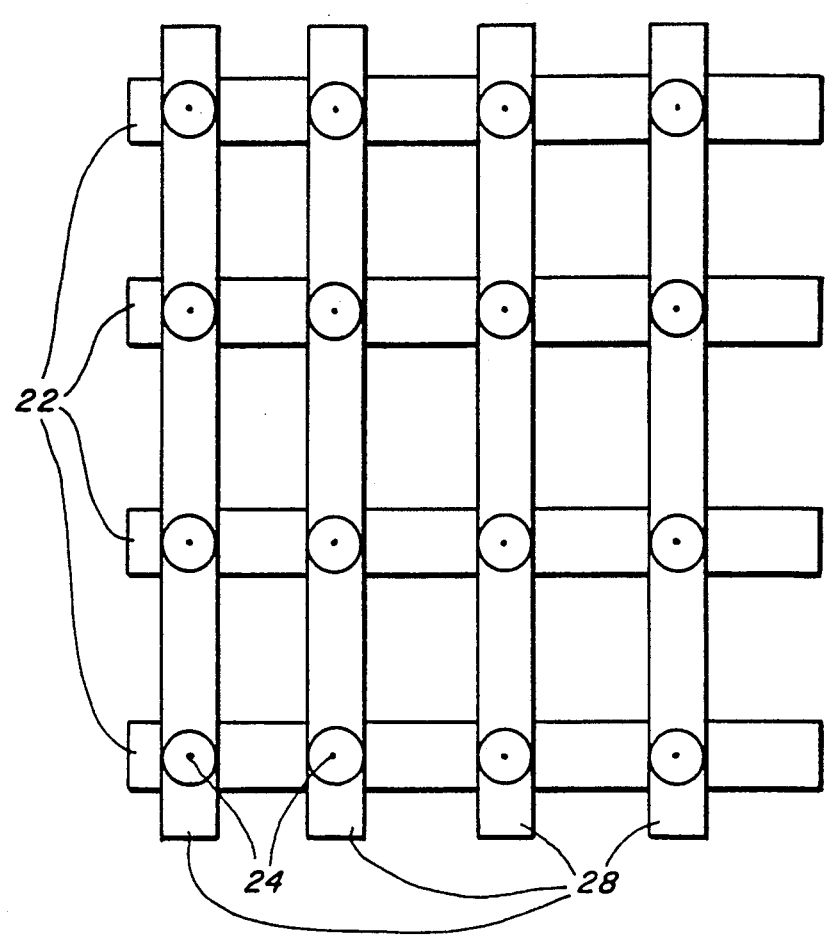
FIG. 7A is an expanded view of another configuration of field emitter array 6 of FIG. 2.
Figure 7B:
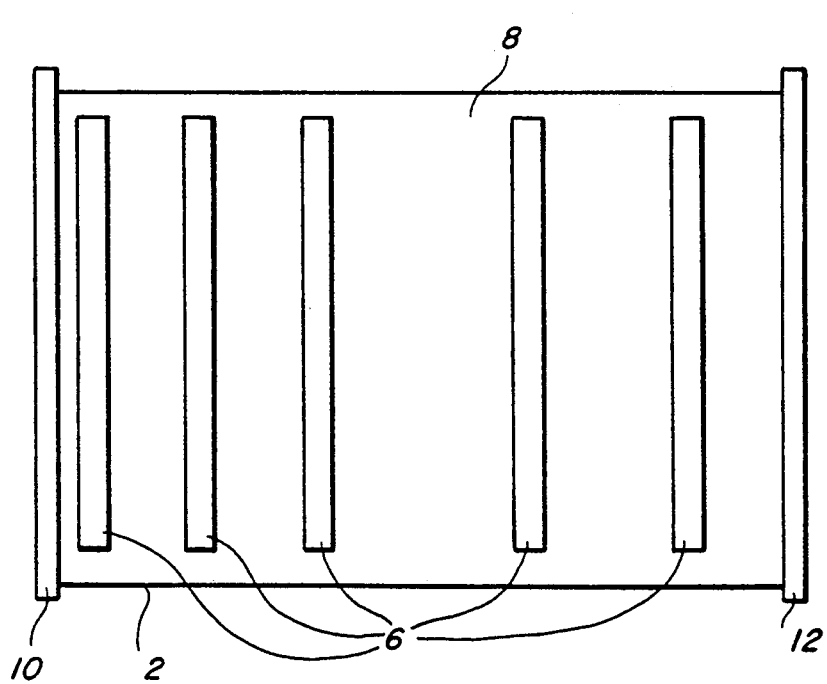
FIG. 7B is a diagrammatic view of the third preferred embodiment of a gas laser system according to the present invention.

Referring to FIG. 7, a field emitter array 6 is shown fabricated in an open grid arrangement wherein two sets of parallel conductive layer strips 22 and 28 are arranged perpendicular to each other. Conical cathode tips 24 are formed on strips 22 at the intersections with strips 28, and project through aligned holes formed in the corresponding strips 28. Advantageously, either the strips 22 and 28 are spaced from each other by a predetermined distance so as to be in noncontacting relationship, or an insulating layer is provided between strips 22 and 28 at the intersection sites. Laser radiation stimulated by electrons 62 produced by cathode tips 24 traverse cavity 8 parallel to the optical axis through the openings in the grid structure of array 6. It will be appreciated that a plurality of arrays 6 advantageously can be located within cavity 8, as shown in FIG. 7B.

It will also be appreciated that the flow of electrons 62 starts with the application of voltage to the field emitter array 6 (6'). There is no significant delay time waiting for the cathode to warm up or for avalanche breakdown to occur. First and second variable power supplies 50, 52 can therefore advantageously be either direct current (DC) voltage sources or pulsed voltage sources. A gas laser system in accordance with the present invention therefore can be operated in a frequency range of about 0 Hz to 100 Ghz.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for electron pumping a gas laser, comprising the steps of:
   locating afield emitter array within a laser cavity envelope having a laser active gas, said field emitter array having a plurality of conducting layers and having an insulating layer between any two of said conducting layers;
   applying a variable first predetermined voltage to said field emitter array effective to cause said array to emit a plurality of electrons from said field emitter array effective to pump said laser active gas to cause said system to lase.

2. The method of claim 1, further comprising the steps of:
   locating an anode parallel to said optical axis of said laser cavity envelope; and
   applying a predetermined anode voltage to said anode.

3. The method of claim 1, wherein said locating step comprises locating said field emitter array substantially parallel to the optical axis of said laser cavity envelope.

4. The method of claim 1, wherein said applying step further comprises the steps of:
   applying a variable first predetermined voltage to said field emitter array between a first conducting layer and a second conducting layer to produce electrons from said field emitter array; and
   applying a variable second predetermined voltage between said first conducting layer and a third conducting layer to control the energy level of said electrons produced by said field emitter array.

5. The method of claim 1, wherein said locating step comprises locating said field emitter array substantially transverse to the optical axis of said laser cavity envelope.

6. A gas laser system comprising:
   a laser cavity envelope having a laser active gas, an optical axis, and first and second reflecting surfaces located perpendicular to said optical axis adjacent to outer edges of said laser cavity envelope;

a field emitter array having a plurality of conducting layers and having at least one insulating layer between any two of said conducting layers;

first power supply means for applying a first variable voltage between a first conducting layer and a second conducting layer of said field emitter array effective to cause said array to emit a plurality of electrons from said field emitter array effective to pump said laser active gas to cause said system to lase.

7. The gas laser system of claim 6, further comprising:
an anode positioned parallel to said optical axis; and
anode power supply means for applying an anode voltage between said anode and said laser cavity envelope.

8. The gas laser system of claim 6, further comprising second power supply means for applying a second variable voltage between said first conducting layer and a third conducting layer of said field emitter array to control the energy level of said electrons produced by said field emitter array.

9. The gas laser system of claim 6, wherein said field emitter array is located substantially parallel to the optical axis of said laser cavity envelope.

10. The gas laser system of claim 6, wherein said field emitter array further comprises a plurality of cathode tips operatively coupled to said first conducting layer for providing said electrons.

11. The gas laser system of claim 10, wherein said cathode tips are disposed non-uniformly in said envelope.

12. The system of claim 10, wherein said field emitter means emits said electrons at energies insufficient to cause electrical breakdown in said gas.

* * * * *